Figure 1:
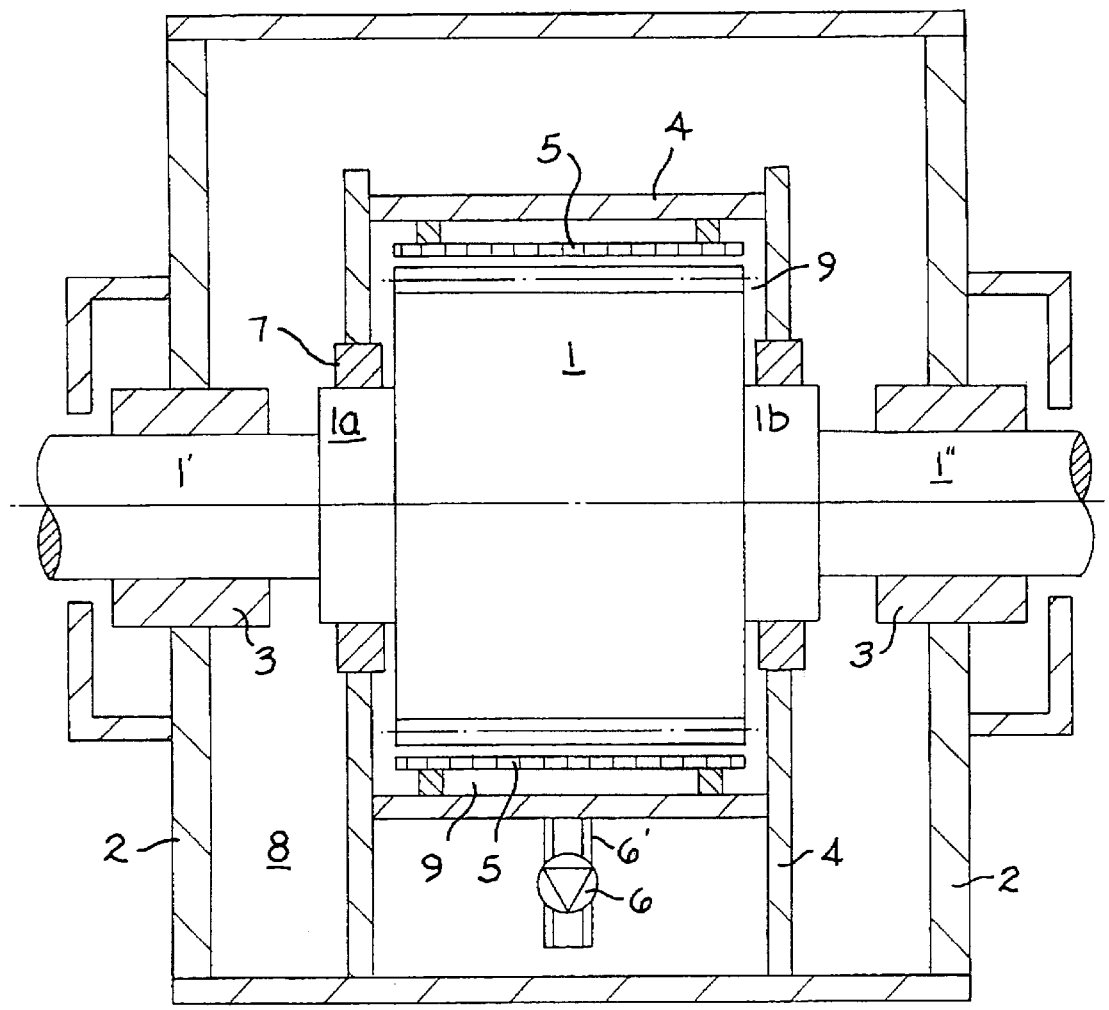

United States Patent
Deeg et al.

[11] Patent Number: 5,950,501
[45] Date of Patent: Sep. 14, 1999

[54] PINION DRIVE

[75] Inventors: Thomas Deeg, Seuzach; Walter Haller, Wettswil, both of Switzerland

[73] Assignee: Maag Getriebe AG, Zurich, Switzerland

[21] Appl. No.: 09/040,397

[22] Filed: Mar. 18, 1998

Related U.S. Application Data

[63] Continuation of application No. 08/676,178, filed as application No. PCT/CH95/00265, Nov. 13, 1995.

[30] Foreign Application Priority Data

Nov. 14, 1994 [CH] Switzerland .............................. 3403/94

[51] Int. Cl.⁶ .................................................. F16H 57/02
[52] U.S. Cl. ........................................... 74/606 R; 74/413
[58] Field of Search .................................. 74/606 R, 572, 74/413, 421 R

[56] References Cited

U.S. PATENT DOCUMENTS 2,589,454  3/1952  Storsand ..................................... 310/89
3,604,617  9/1971  Patterson ........................... 74/606 R X Primary Examiner—Charles A. Marmor
Assistant Examiner—Saúl Rodríguez
Attorney, Agent, or Firm—Laurence R. Brown

[57] ABSTRACT

The low-loss pinion drive has a housing (2) in which the gear wheels are fitted in radial bearings (3) and preferably also an additional inner housing (4) enclosing the pinions (1) as closely as possible. At least the air and preferably also the lubricating and cooling oil can be evacuated from the inner casing chamber (9). The air is evacuated by a pump which is also suitable for removing the oil. The air can be replaced by a gas of substantially lower density than air.

3 Claims, 4 Drawing Sheets

PINION DRIVE

This application is a continuation of the co-pending application Ser. No. 08/676,178, filed Aug. 26, 1996 which is a 371 of PCT/Ch95/00265, filed Nov. 13, 1995 for Pinion Drive.

The present invention pertains to a pinion gear with two or more meshing pinions that are fitted in bearings inside of a main gear housing.

During the power transfer, approximately half of the performance losses of a pinion gear occur in the bearings, with the remainder of the performance losses being caused by the meshing gears. These gearing losses are composed of the gear friction, the ventilation of the rotating bodies and the crushing losses caused by the meshing gears. In pinion gears in which the gears revolve at high circumferential speeds in excess of 80 m/sec, the friction losses of the gears are negligibly small as compared to the ventilation and crushing losses. The ventilation losses are caused by the resistance of the rapidly rotating gears in the medium air that is interspersed with fine oil droplets. The crushing losses occur within the region in which the gears engage and the volume between the two directly meshing gear flanks becomes continuously smaller due to the rolling motion of the gears. In addition, the medium situated between the gear flanks needs to be displaced while the gears are meshing. In gears that are provided with oil injection into the region in which the gears disengage, the medium to be displaced also consists of air that is interspersed with fine oil particles.

The present invention is based on the objective of realizing a low-loss pinion gear by preventing ventilation losses and, if applicable, crushing losses.

In a rapidly revolving pinion gear of the initially defined type, this objective is attained with the characteristics disclosed in claim 1.

The invention is based on the idea of either evacuating or filling the surroundings of the rotors, with a gas, namely in such a way that the relative density of the surroundings in which the rotors rotate is reduced. Particularly suitable gases for this purpose are hydrogen and helium (1st period in the periodic system of elements).

Helium has a density (0.18 kg/m$^3$) that is 7 times lower than that of air. Consequently, a state that is similar to a rough vacuum, i.e., approximately 85% vacuum, can be expected in a space that is filled with helium at an ambient pressure of one atmosphere (1 atm). The advantages of such an operating state as compared to a rough vacuum solution are described below:

Helium is an inert gas that does not react with the surroundings and consequently is entirely nonpoisonous.

Elimination of suction pumps. Identical pressure between different chambers. The air is evacuated for the starting phase.

Elimination of reinforcements for the gear housing due to the vacuum.

Reliable failure system.

According to one particularly preferred embodiment, an additional inner housing is provided which encloses the pinions. In this embodiment, the inner housing is evacuated or an atmosphere with a lower density than air is created in this inner housing.

The means for evacuating the air from the interior of the inner housing are preferably realized and arranged in such a way that the lubricating and cooling oil can also be removed from the interior, i.e., crushing losses are effectively prevented.

Due to the fact that an additional inner housing is provided which encloses the pinions as closely as possible, it is possible to evacuate the air from the immediate surroundings of the pinions without an unjustifiably high power requirement.

In a pinion gear in accordance with the invention, the medium air is largely removed from the meshing and rapidly rotating pinions, namely by generating a partial vacuum. Due to this measure, the ventilation losses and crushing losses are eliminated and a significant improvement in the total degree of efficiency of the pinion gear is attained because the predominant portions of the gearing losses are eliminated. Significant energy savings or an increased production capacity are attained for the users of such pinion gears, e.g., power generation systems.

Particularly preferred embodiments of the pinion gear in accordance with the invention are defined in the dependent claims.

If the seals for the shaft penetrations between the wall of the inner housing and the shaft are realized in the form of viscous seals and the oil does not have to be simultaneously removed, these viscous seals can be used as means for evacuating the air from the interior (no additional power requirement). However, a pump that, in addition to the air, also removes the oil from the interior is normally used.

Figure 2:
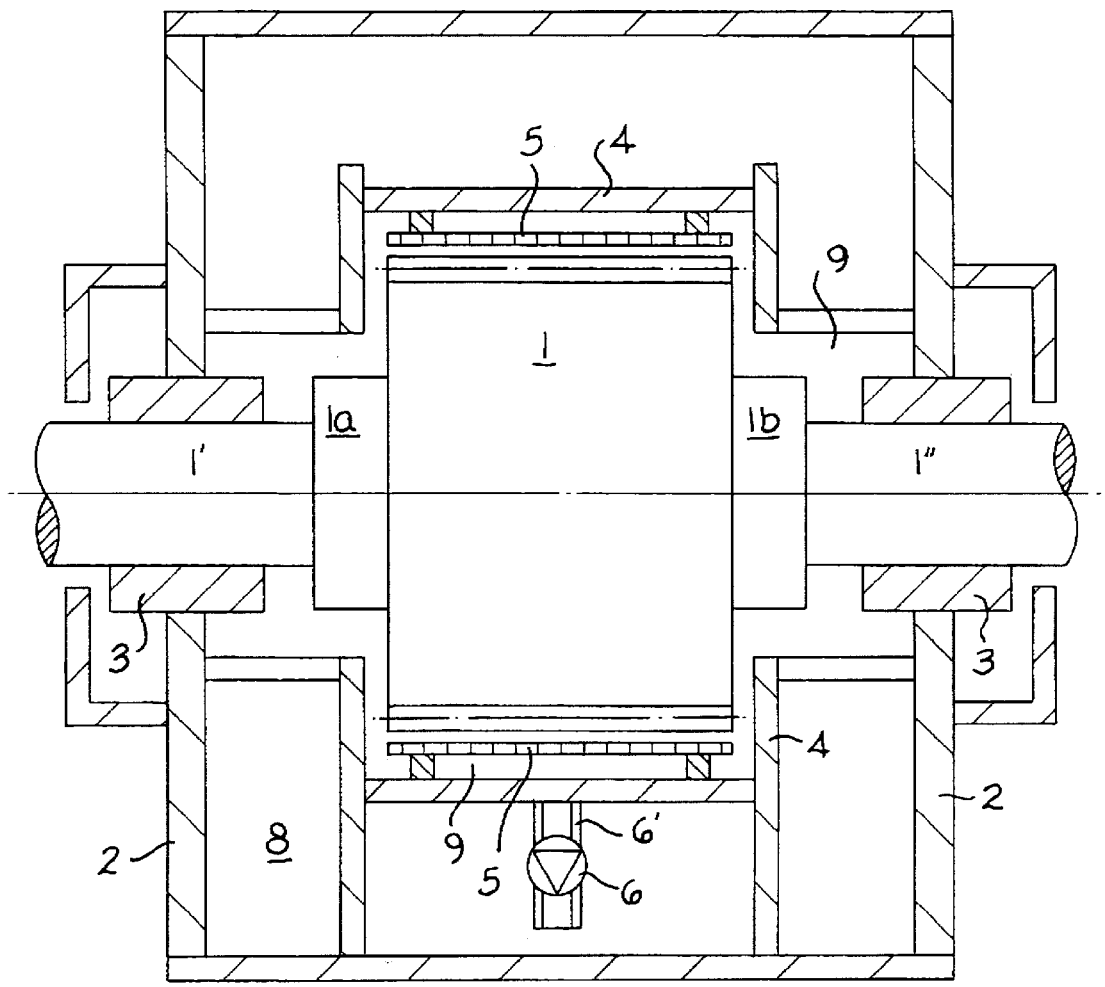
Figure 3:
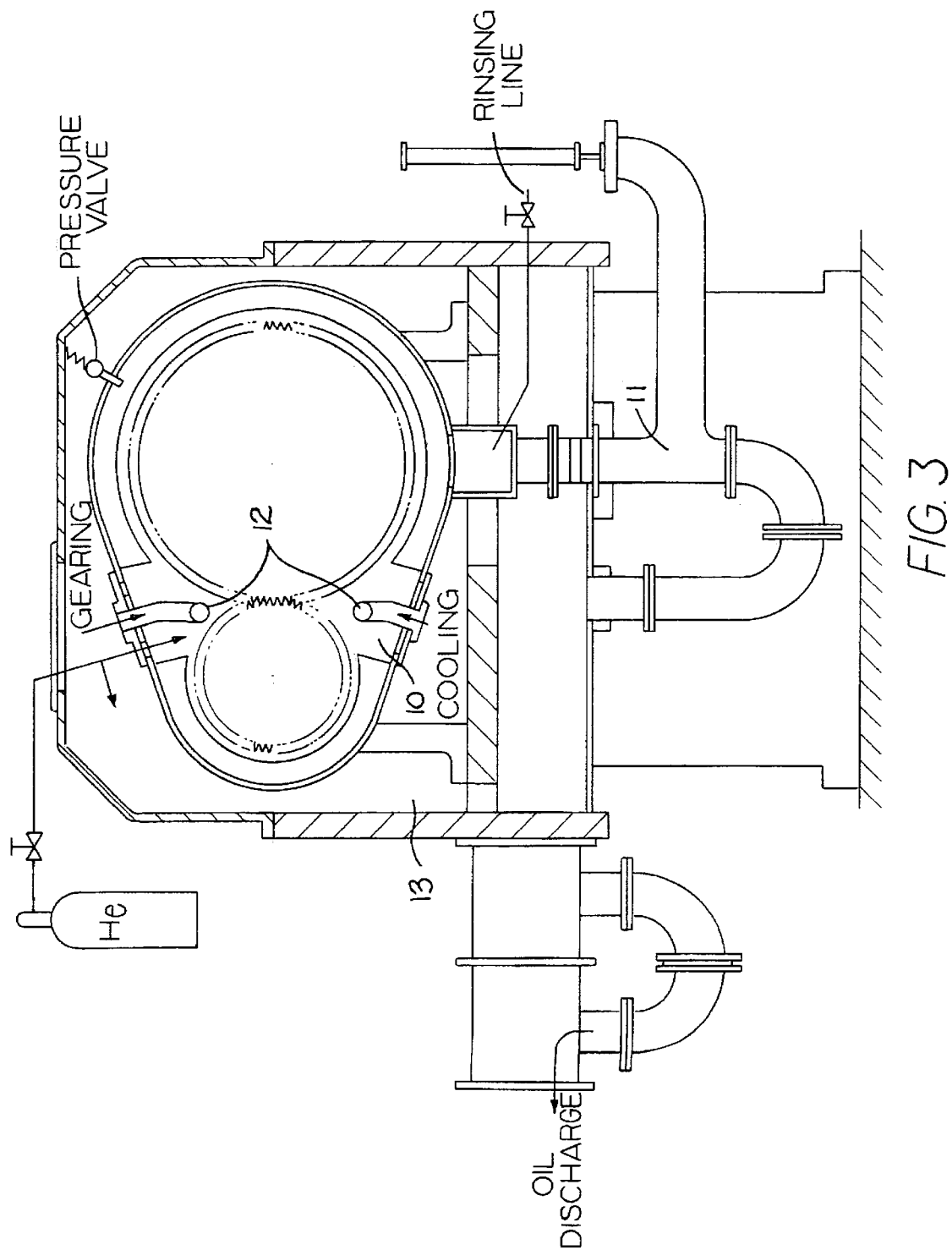

The invention is described in detail below with reference to one embodiment that is illustrated in the figures. The figures show:

FIG. 1, a vertical section through a first embodiment of a schematically illustrated pinion gear according to the invention;

FIG. 2, one variation of the pinion gear which is realized similar to FIG. 1;

FIG. 3, a pinion gear with an open oil/helium circuit, and

Figure 4:
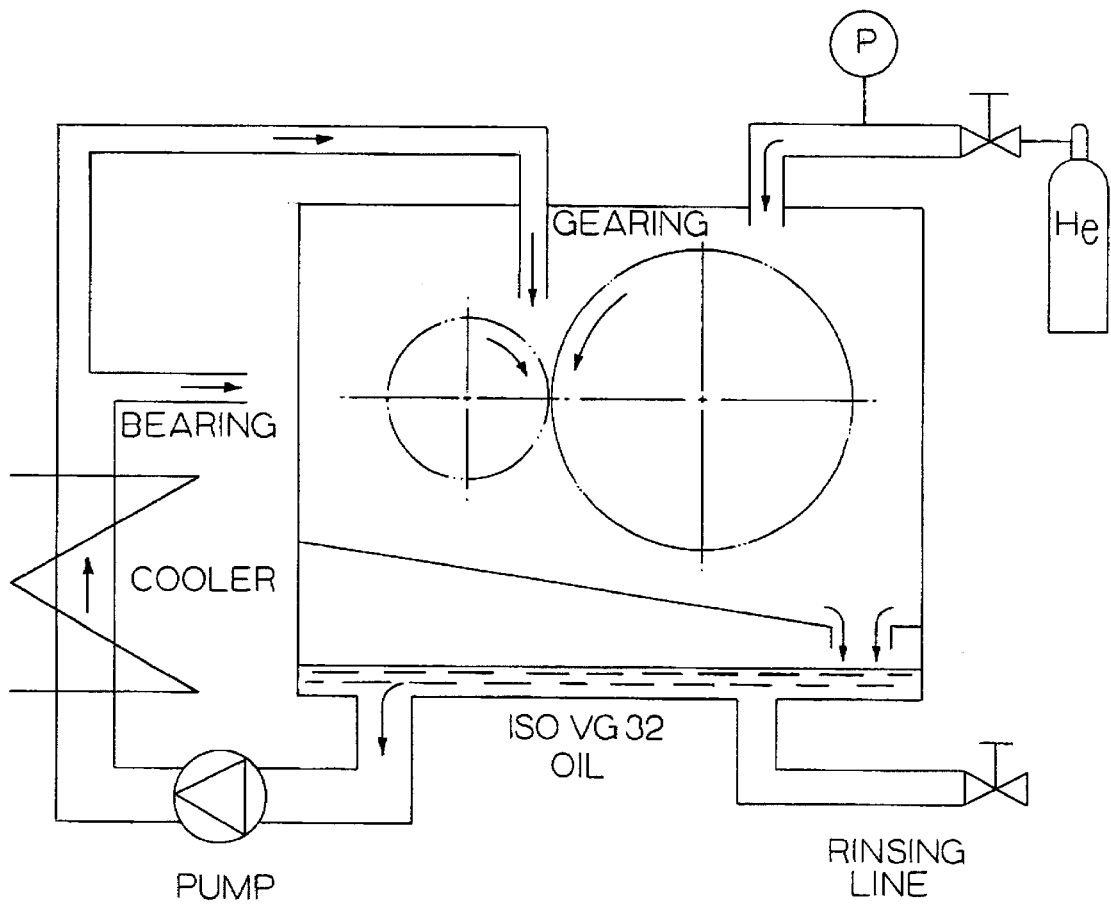

FIG. 4, a pinion gear with a closed oil/helium circuit.

FIG. 1 shows a low-loss pinion gear according to the invention. In this case, the shafts 1',1" of several meshing pinions 1 are fitted in radial bearings 3 inside of a conventional main housing 2. The essential characteristic of the invention consists of providing an inner housing 4 in addition to the customary voluminous main housing 2. This inner housing encloses the pinions 1 as closely as possible. The respective pinion shaft sections or hubs 1$a$ or 1$b$ lead through through-bearings in the lateral walls of the inner housing 4, with so-called viscous seals 7 being provided between the rotating surfaces of the shaft sections 1$a$, 1$b$ and the stationary wall surfaces. These generally known shaft seals can be used as pumps for evacuating the air situated in the interior of the inner housing 4 and conveying this air into the chamber 8 of the main housing 2, which is under atmospheric pressure.

In the embodiment shown, an outlet 6' is provided in the lower part of the inner housing. A pump 6 for evacuating the air and removing the oil from the oil sump of the vacuum chamber 9 is provided in the aforementioned outlet. In order to rapidly collect the lubricating and cooling oil injected into the region in which the gears disengage and convey said oil to the oil sump, oil collection plates 5 are provided in the immediate vicinity of the gear tips. These oil collection devices are the object of a patent with the same application date as the present patent application.

Naturally, it would be ideal to create the most complete vacuum possible in the interior 9 of the inner housing so as to prevent ventilation losses. However, a partial vacuum, the intensity of which can be adjusted by means of the pump 6, suffices in practical applications.

Since the crushing losses (due to oil enclosed in the meshing gears) are also largely eliminated in the embodiment shown due to the evacuation of the majority of the oil, the total degree of efficiency of the pinion gear is optimized, i.e., increased production capacities of the pinion gear are attained.

FIG. 2 shows a pinion gear that is realized similar to FIG. 1. The difference between these two embodiments can be seen in the fact that the through-bearings in the lateral walls of the inner housing 4 are not realized in the form of viscous seals. The contactless through-bearings of the side walls are directly connected to the inner wall of the main housing in sealed fashion, namely in the vicinity of the shaft sections 1',1" or 1$a$,1$b$ and in such a way that they surround the radial bearings 3. The interior 9 of the inner housing 4 which needs to be evacuated is slightly larger than in FIG. 1, with the seals being provided in the radial bearings 3 in this case. In this embodiment, the evacuation is exclusively carried out by the vacuum pump 6.

FIG. 3 shows a variation of a pinion gear with an open oil/helium circuit. During the starting phase, the rotor chamber 10 with the air contained therein is rinsed with helium. A helium lock (siphon) 11 prevents the discharge of the helium from the rotor chamber. The oil accumulated from the gear lubrication/cooling 12 and the floating rings is discharged from the chamber 13 that encloses the rotors due to gravity. The floating rings and the siphon prevent the admixture of air. The only interfering factor is the air contained in the introduced oil. This air can be prevented from being admitted into the interior by suitable technical measures (liquefying the air with the aid of the Linde method, membrane filters for helium, rinsing out the air before the introduction into the helium chamber, etc.).

FIG. 4 shows an embodiment with a closed oil/helium circuit. This closed arrangement differs from the open arrangement due to the fact that the gear oil is circulated in a separate oil circuit that includes a heat exchanger, namely in a helium atmosphere instead of air.

We claim:

1. A pinion gear assembly with two or more meshing pinions that are fitted on shafts and bearings positioned inside of a main gear housing having an interior at substantially atmospheric pressure, comprising in combination, an inner gear housing positioned within the main gear housing and sealed therefrom to maintain an atmosphere of reduced density obtained by at least partially removing the air therefrom, said inner gear housing containing said meshing pinions and located within the main gear housing such that an atmosphere of lower density than air may be created and maintained so that the density of gas in the sealed interior is substantially reduced from the density of air inside the main gear housing during the operation of the pinion gear and, pump means for creating and maintaining said atmosphere that has said lower density than air by evacuating the air from the interior of the inner housing located in said main gear housing, and including further oil pumping means able to remove and recirculate lubricating and cooling oil from the interior of the inner gear housing.

2. A pinion gear assembly for reducing crushing losses in pinion gearing encountered by fine oil particles carried in a gaseous medium into the pinion gearing, comprising in combination:

a main gear housing with an internal air atmosphere maintained at substantially atmospheric pressure, an inner gear housing located within said main gear housing having sealing structure to maintain a gaseous atmosphere of lower density than air at atmospheric pressure, at least two meshing pinion gears located within the lower density atmosphere of said inner gear housing, lubrication means providing lubrication to said meshing pinion gears, and a pump for maintaining said atmosphere within said inner gear housing comprising means for evacuating gas interspersed with fine oil particles from said inner housing and replacing the evacuated gas with substantially oil free gas.

3. A pinion gear assembly as defined in claim 1 wherein said pump means further comprises means for introducing a gas of lower density than air.

* * * * *